United States Patent

[11] 3,588,880

[72] Inventors Robert D. Gross
North Caldwell;
Marvin Masel, West Englewood; Peter K. Scholl, West Paterson, N.J.
[21] Appl. No. 770,166
[22] Filed Oct. 24, 1968
[45] Patented June 28, 1971
[73] Assignee Singer-General Precision, Inc.
Little Falls, N.J.

[54] MULTIPLEXED DIGITAL TO AC ANALOG CONVERTER
4 Claims, 4 Drawing Figs.

[52] U.S. Cl. .................... 340/347DA
[51] Int. Cl. .................... H03k 13/04
[50] Field of Search .................... 340/347, 347 (SH); 179/15 (LL)

[56] References Cited

UNITED STATES PATENTS 3,026,511 3/1962 Davis .................... 340/347
3,182,302 5/1965 Horn 340/347
3,223,992 12/1965 Bentley et al .......... 340/347
3,059,228 10/1962 Beck et al .... 340/347UX

*Primary Examiner*—Daryl W Cook
*Assistant Examiner*—Michael K. Wolensky
*Attorneys*—S. M. Bender, S. A. Giarratana and G. B. Oujevolk

ABSTRACT: A multiplexing digital to analog converter comprising: input gate means to receive more than one digital signal; an output section coupled to the input gate means; a reference signal source coupled to the input gate means to convert each digital signal to AC form and connections to feed said converted signal to the output section; sampling means to rapidly sample the changing values in said output section for storage; capacitor storage means coupled to the output section for storing said values thereon; and, output filter and amplifier means fed by said capacitor storage means to provide smoothly changing AC outputs corresponding to each of said digital signals.

INVENTORS
ROBERT D. GROSS
MARVIN MASEL
PETER K. SCHOLL
BY
S. A. Giarratana
George B. Oujevolk
ATTORNEY INVENTORS
ROBERT D. GROSS
MARVIN MASEL
PETER K. SCHOLL
BY
S. A. Giarratana
George B. Oujevolk
ATTORNEY

INVENTORS
ROBERT D. GROSS
MARVIN MASEL
PETER K. SCHOLL

BY S. A. Giarratana
George B. Oujevolk
ATTORNEY

MULTIPLEXED DIGITAL TO AC ANALOG CONVERTER

DESCRIPTION OF THE INVENTION

The present invention relates to multiplexing and more particularly to the multiplexing of varying digital information which is converted to analog AC form, e.g., digital numbers representing sine and cosine of shaft angle which is converted to a voltage used to simulate the output of a synchro or resolver.

The expression "multiplexing" relates to time sharing. Thus, as described in the Bob N. Naydan et al. U.S. Pat. No. 3,277,464, two resistor ladder networks are used, one for the sine simulation and the other for the cosine simulation.

In practice, it has been found that several similar systems are often mounted on aircraft. Some systems are used for inertial navigation, others for stellar navigation, still others for gunnery fire control equipment, etc. This in effect would mean considerable duplication of the components described in the Naydan et al. U.S. Pat. No. 3,277,464. A somewhat similar system but performing precisely the reverse type of computations is described in the George F. Schroeder et al. U.S. Pat. No. 3,071,324 which again has many of the same components.

In the light of the above situation, it appears logical to have several separate systems make use of common components. When these components are not used at the same time, this presents no problem. However, when the same component has to be used by two or more systems at the same time, difficulties arise.

One of the main components used is the previously mentioned resistor ladder network and associated transistor switches. Since these systems are designed for aircraft, reduction in size and weight of the systems is absolutely essential, a resistor ladder network is of necessity bulky. Individual resistors are required to provide the necessary values required by the system. Even though the size of the individual resistors can be reduced to some extent, these components still take up valuable space. The present invention therefore contemplates using only one resistor network and associated switches where several were heretofore required and the resistor network input and outputs are multiplexed so that several channels use the same network and switches.

Although information presented in DC form can usually be multiplexed without too much difficulty, information in AC form is not easily handled. This is because the AC is constantly changing in value.

The present invention therefore provides for the multiplexing of digital input corresponding to a changing sine/cosine value, sampling the product of each digital input multiplied by an AC reference, and obtaining from the ladder network a corresponding analog value in voltage form. This voltage is stored in one of a number of capacitors between samples. Output amplifiers filter the sampled waveform and provide AC drive for synchros.

DESCRIPTION OF THE DRAWINGS

The invention as well as other objects and advantages thereof will become more apparent from the following detailed description when taken in conjunction with the accompanying drawings.

In the present invention which has particular application as a digital-to-synchro converter, use is made of only a single binary weighted resistor network, a set of discrete transistors as shunt switches, and a small, relatively inexpensive monolithic integrated amplifier as a buffer, and as many output power amplifiers as there are channels to be converted.

Briefly stated, the operation of the converter using the proposed technique is as follows: One binary word is electronically selected by enabling the set of NAND or AND gates to which the bits of that word are fed. At the same time, the series switch to the output amplifier corresponding to that word is closed. The bits now operate the transistors which switch the appropriate branches of the resistor network in or out. The currents flowing through the branches which are still switched in are summed by a buffer amplifier and fed through the closed series switch to the output amplifier. Each digital input is sampled in this fashion for a short period of time, and at a repetition rate of the order of 100 times during each cycle of the AC frequency.

Figure 1:
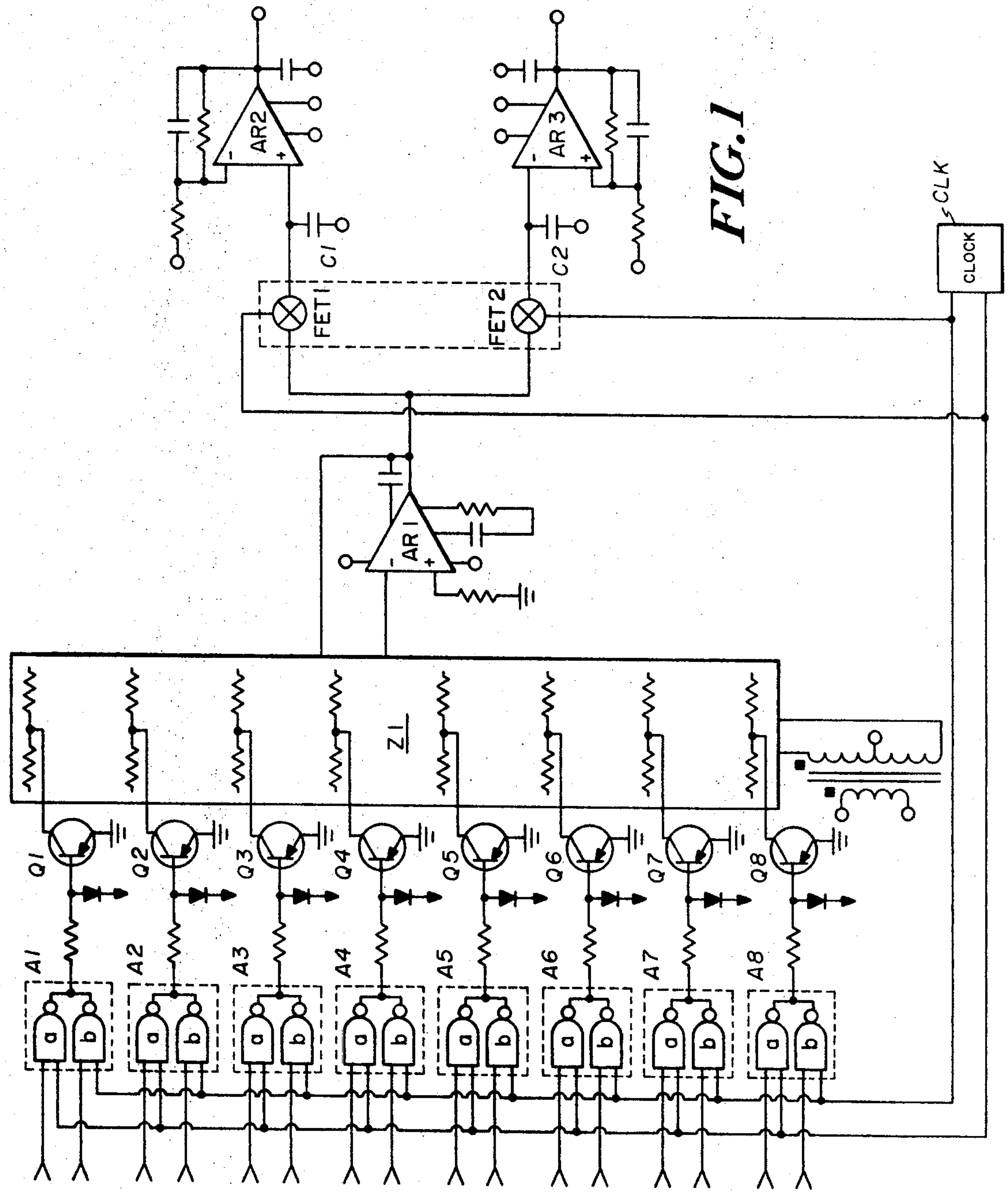
FIG. 1 is a block and schematic explanation of the invention in simplified form.

In the arrangement shown in FIG. 1, the technique is shown for a two-channel system, one referred to as sine and the other cosine. The inputs for both channels are 7 bits of binary coded information plus a sign bit. The outputs for both channels are a single phase 400 cycle AC waveform. Gates A1 through A8 are used to allow either the sine or the cosine digital word to operate transistor switches Q1 through Q8. These switches control the various branches of resistor network Z1. The output of the network is buffered by amplifier AR1 and fed to either AR2 or AR3, depending on which side of the dual field effect transistor, FET, switch is closed by a clock, CLK. The two 0.05 microfarad capacitors C1 and C2 at the inputs to AR2 and AR3 "remember" the voltage level while the other channel is being sampled. In the system shown, a 20 kHz. clock frequency is used, and the analog output has a full scale amplitude of 11.8V RMS.

Reviewing the system just described, two digital inputs each consisting of 8 bits (7 bits plus one sign bit), must be converted to voltages. One input is the sine, the other the cosine of an angle. These are shown in FIG. 1 as gate groups A1 through A8. Each gate group has two sections, *a* and *b* each section being in turn an AND gate. One section *a* is for the sine bits, the other section *b* is for the cosine bits. Since *a* and *b* are AND gates, there will be no output unless there is a second input. The second input is supplied by a clock CLK whose workings will be described in greater detail herein.

Each gate group A1 through A8 controls a switch Q1 through Q8 which acts on the resistor network Z1. The operation of this type of network has been described in the Naydan et al. U.S. Pat. No. 3,277,464.

The output of the network Z1 is fed to a buffer amplifier AR1 and in turn fed to either amplifier AR2 or AR3. The particular output amplifier AR2 or AR3 is in turn determined by switches FET 1 and FET 2. The switching sequence in turn is determined by the clock circuit CLK which has lines feeding both the AND gates *a* and *b* as well as switches FET 1 and FET 2. The outputs from AR2 and AR3 are analogs of the sine and cosine digital inputs.

Figure 2:
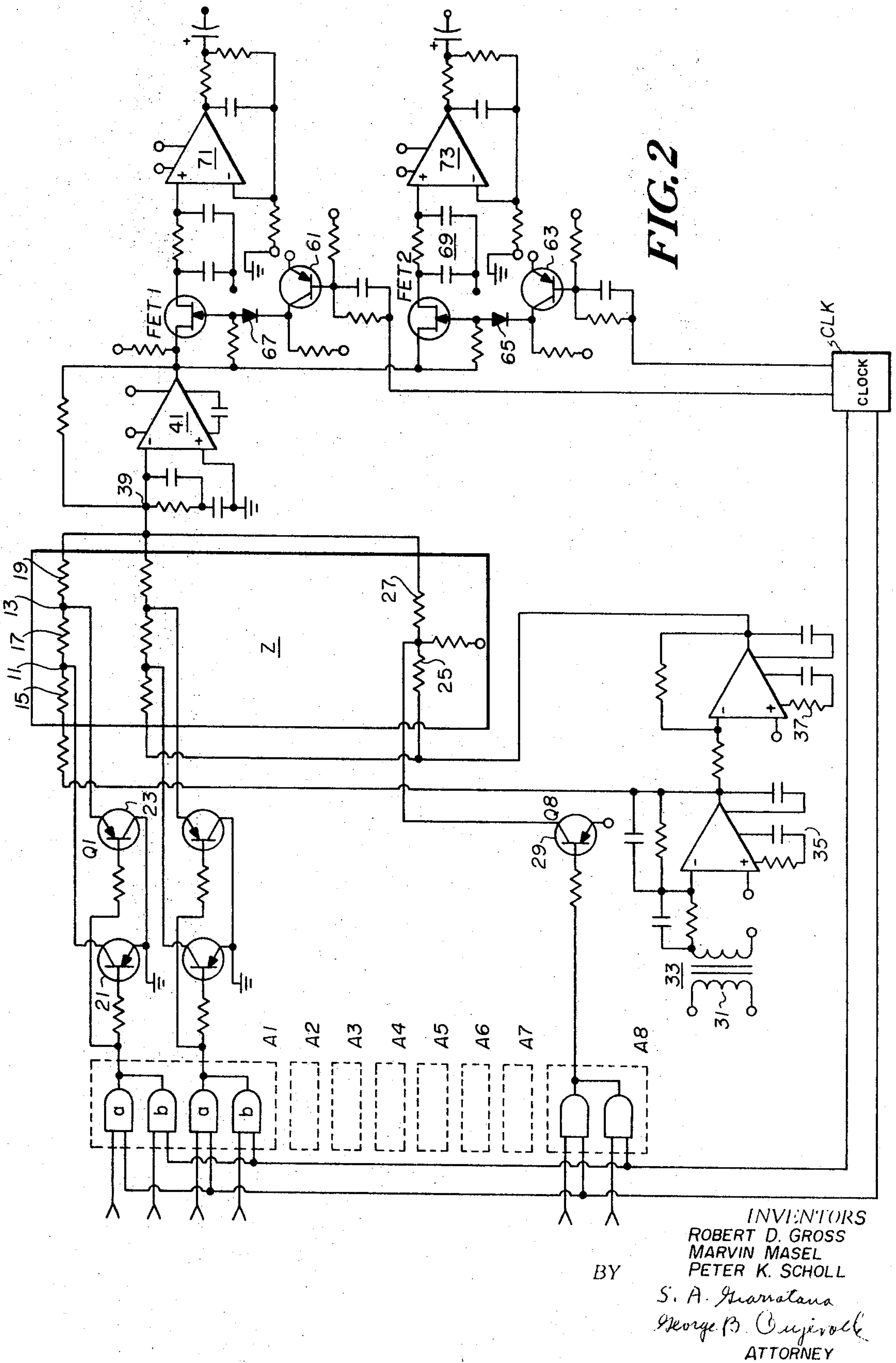
FIG. 2 shows a functional embodiment of the invention in a schematic and block diagram.
Figure 3:
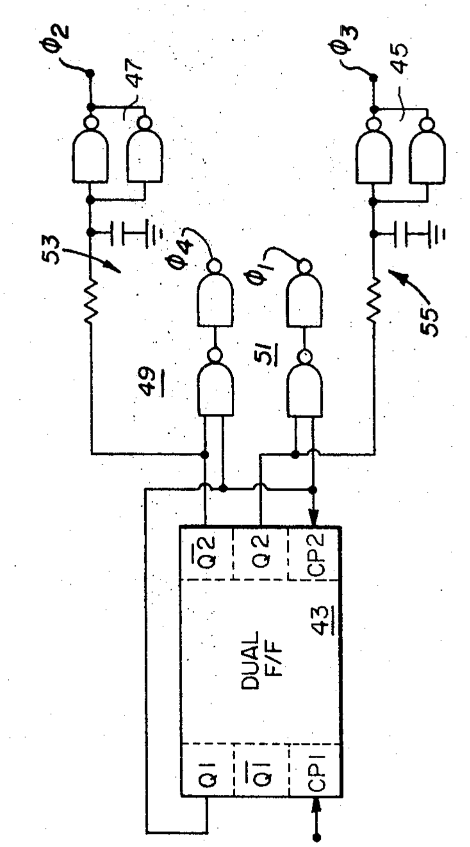
FIG. 3 illustrates in block and schematic form the clock unit used in the invention; and, FIG. 4 illustrates in graphic form the time sequence of the unit clock.

A practical embodiment of the converter just described is shown in FIG. 2. The gate groups A1 through A8 are repeated. Switches Q1 through Q8 are shown in a more practical manner and, the ladder network Z is shown with two switching points 11 and 13. This is because the transistor switches used in practice act as voltage dividers rather than open and closed switches. There is therefore a residual current flow through the network when the transistor switch "opens." This residual current is a result of the voltage divider arrangement used. To cancel or substantially eliminate this residual current, a series of resistors 15, 17, 19 are used with transistor switches 21, 23 acting on the switching points 11. This circuitry produces a greater simulation of an open and closed switching arrangement.

In the bits of lesser significance, e.g., corresponding to gate A8, a two resistor branch with resistors 25, 27 and one transistor 29 can be used.

The ladder network of resistors has branches corresponding to each bit plus a "sign" bit branch. The power from an AC line is fed to the sign bit branch of the latter network 180° out of phase with the AC power fed to the other branches so that the rest of the branches in the network are subtracted from the sign bit. To properly control the AC power fed to the ladder network, a phase shift control circuit 33 is used. The reason for this phase shift control is that on the output side of the network there is a phase lag which is compensated for on the input side. The phase shift control circuit also has first and second amplifiers 35 and 37. Amplifier 37 is an inverter amplifier which will provide the 180° phase inversion from the output of amplifier 35 so that the AC power fed to the sign branch is 180° out of phase with the AC power fed to the rest of the branches, for the reasons described above. Therefore, the digital input supplied across gates A2 through A8 will be the digital value. The input supplied across gate A1 is the sign (plus or minus) of the digital value, which digital value will then appear as the envelope of an AC voltage at output point 39. Each gate in turn has two AND gates *a* and *b* and each gate will be sampled periodically. The AC analog output from the ladder network 39 is amplified in an amplifier 41 and is to be fed to the proper output as a simulated sine or cosine value. The analog value will go to the proper output across switches FET 1 and FET 2.

It is now necessary to examine the clock circuit CLK. The clock itself works from a clock pulse supplied externally from a pulse source. The clock must provide four outputs:

First—to the sine output switch FET 1

Second—to the sine input switch AND gates A1*a* through A8*a*

Third—to the cosine input switches AND gates A1*b* through A8*b*

Fourth—to the cosine output switch FET 2.

The objective is to sample the values supplied through gates A1*a* through A8*a* and then sample the values supplied through gates A1*b* through A8*b*. This sampling goes on continuously switching from the "*a*" gates to the "*b*" gates. The value sensed is a constantly changing AC to properly carry out this sampling, the "rise" time or "lag" time of the system is taken into account.

Therefore, each sampling is done during a period of 5 microseconds in a 10-microsecond time period. The switching from one group to the other is offset and does not take place immediately. This is shown in FIG. 2 where the *a* group AND gates are enabled for 10 microseconds on the input side but the FET 1 switch on the output side is only enabled for 5 microseconds well within the 10-microsecond period. Likewise when the *b* group AND gates are transmitting, the switch FET 2 is only open for a part of the time.

Thus, the clock consists of a dual flip-flop 43 on the input side. Dual flip-flop 43 has four outputs which are enabled by a clock pulse supplied by a clock pulse source. Clock pulse 1 acts on the Q1 and $\overline{Q1}$ side. Clock pulse 2 acts on the Q2 and $\overline{Q2}$ side. Q2 and $\overline{Q2}$ will supply an output Φ2 and Φ3 to group *a* and *b* in opposite phase by means of inverter gates 45 and 47.

Figure 4:
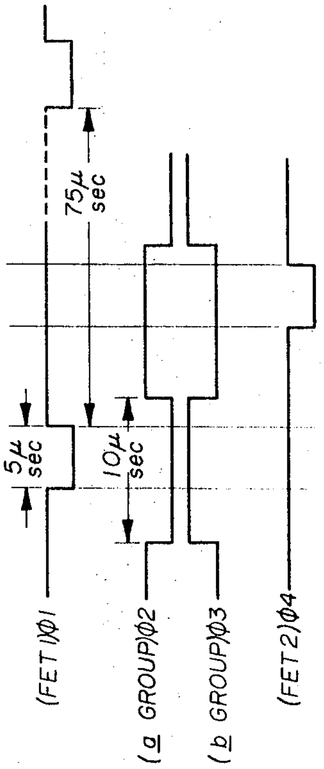

Outputs Φ1 and Φ4 must be supplied to FET 1 and FET 2 with the time lag. This is accomplished by the countdown capabilities of the dual flip-flop 43 and a set of inverters 49, 51 to properly enable the flip-flops to provide the desired outputs. An input square wave is applied to input terminal CP1 of the dual flip-flop 43, and this square wave is counted down twice by the dual flip-flop and its associated circuitry to provide the waveform Φ2 at the output of the inverter gate 47 and the waveform Φ3 at the output of the inverter gate 45. Respective resistance-capacitance networks 53 and 55 precede the inverter gates 47 and 45 to adjust the time delays between the waveforms Φ1 and Φ2 and Φ3 and Φ4, as shown in FIG. 4. The countdown capabilities of the dual flip-flop 43 are provided by causing the Q1 section of the dual flip-flop to introduce its square wave to the input terminal CP2 of the Q2 section, so that the Q2 section is triggered at a lower rate than the Q1 section.

As a result of the action of the clock circuits, switches FET 1 and FET 2 will open for a one-half of the time that the group *a* gates are passing information. These switches, FET 1 and FET 2, consist of one FET transistor 57, 59, a driver transistor 61, 63 acting on the base of the FET transistors across a diode 65, 67. The clock circuit outputs act on the bases of the driver transistors which in turn act on the FET transistors. The output from the FET switches are filtered in a ripple filter 67, 69 shown as a resistor with capacitors on the input and output side thereof. The filtered outputs are next fed to an amplifier state 71, 73. These amplifiers, in turn, provide an AC output voltage simulating a synchro output varying from 0 volts to 11.8 volts RMS.

It is to be observed therefore that the present invention provides for a multiplexing digital to analog converter wherein more than one digital signal is received at input gate means. A reference signal source coupled to the input gate means is used to convert each digital signal to AC form in an output section. The rapidly changing AC values appearing at the output section are sampled by sampling means for storage, and capacitor storage means are coupled to the output section for this purpose. The values so stored are then provided as a smoothly changing AC output by an output filter and amplifier arrangement.

In the concrete embodiment herein described, there are a plurality of gate groups A1 through A8, each corresponding to a digital value which is incremented from one gate group to the next succeeding gate group. There are a plurality of AND gates *a* and *b*, etc. in each gate group, each AND gate in each group corresponding to a first, second and up to an *n*th channel of information, said AND gates all having a common output for the gate group and one of the inputs being the digital signal from said first, second, and *n*th channels, respectively. The one common output for each of the gate groups acts on a separate branch of a resistor ladder network (Z) which is fed a predetermined electrical signal said signal, after passing through the network then having an electrical value on the output side determined by the resistors enabled into the network. On the output side of the ladder network are a plurality of switches fed by the ladder network output. These switches correspond in number to said channels of information. Finally, clock means with circuitry to the other input of the AND gates and to the switches sequentially act to pass the digital information arriving at each set of AND gates common to one channel of information through the ladder network and then out in analog form through the appropriate switch. Preferably the clock is so timed that the switch is opened only a portion of the time period that its channel is acting on the network said time portion being towards the center of said time period.

Obviously, many additional variations and modifications will be apparent to those skilled in the art without departing from the principles of the present invention.

We claim:

1. A digital to analog converter, comprising in combination:

a. a plurality of gate groups (A1 through A8) each corresponding to a digital value, said digital values being incremented from one gate group to the next succeeding gate group;

b. AND gates (a and b) in each gate group, each AND gate in each group corresponding to at least a first or second channel of information supplying separate digital inputs thereto, said AND gates each having first and second inputs and all having a common output for the gate groups and one of the first and second inputs being the signal from the first or second channel;

c. a resistor ladder network (Z) having resistor branches, each branch being separately enabled into or shorted out of the network by said one common output of one of said gate groups, an AC reference signal source coupled to said resistor ladder network, an input side of said ladder network being fed a predetermined electrical signal which after passing through the network will have an electrical quantity on the output side determined by the resistors enabled into the network and appearing as the envelope of an AC voltage;

d. a plurality of switches on said output side of said ladder network fed by said network output side, said switches corresponding in number to said channels of information; and e. clock means with circuitry to the other of the first and second input of said AND gates and to said switches and acting on said AND gates and on said switches to sequentially pass the digital input presented at each set of AND gates to one channel of information through the network and then to pass out the corresponding output from the network in analog form through the appropriate switch at a rate high compared with the frequency of the AC reference signal.

2. The digital to analog converter claimed in claim 1 wherein said clock means includes a logic circuitry including first time means acting on said AND gates other inputs for a first time period, and second time means acting on said switches for a second time period shorter than said first time period.

3. The digital to analog converter claimed in claim 1 and which includes storage means coupled to said switches for storing the outputs passed by said switches between successive switching operations.

4. The digital to analog converter claimed in claim 3 and which includes output filter and amplifier means coupled to said storage means and responsive to the outputs stored therein to provide smoothly changing AC outputs corresponding to each of said digital inputs.